United States Patent
Harada et al.

(10) Patent No.: US 8,366,034 B2
(45) Date of Patent: Feb. 5, 2013

(54) SEAT BELT RETRACTOR

(75) Inventors: Tatsuya Harada, Yokohama (JP); Hiroko Yoshikawa, Yokohama (JP)

(73) Assignee: Autoliv Development AB, Vargarda (SE)

( * ) Notice: Subject to any disclaimer, the term of this patent is extended or adjusted under 35 U.S.C. 154(b) by 226 days.

(21) Appl. No.: 12/756,420

(22) Filed: Apr. 8, 2010

(65) Prior Publication Data

US 2010/0270414 A1   Oct. 28, 2010

(30) Foreign Application Priority Data

Apr. 28, 2009 (JP) ................... 2009-110189

(51) Int. Cl.
*B65H 75/48* (2006.01)
(52) U.S. Cl. .................... 242/390; 242/390.8
(58) Field of Classification Search ............. 242/390, 242/390.8; 310/71
See application file for complete search history.

(56) References Cited

U.S. PATENT DOCUMENTS

| | | | |
|---|---|---|---|
| 7,735,767 B2* | 6/2010 | Saito et al. | 242/390.8 |
| 7,988,197 B2* | 8/2011 | Takao et al. | 280/807 |
| 8,028,949 B2* | 10/2011 | Saito et al. | 242/374 |
| 2007/0278338 A1 | 12/2007 | Saito et al. | |
| 2008/0012284 A1 | 1/2008 | Inuzuka et al. | |
| 2008/0283652 A1* | 11/2008 | Saito et al. | 242/390 |

FOREIGN PATENT DOCUMENTS

| | | |
|---|---|---|
| AU | 5230294 AA | 10/2005 |
| CA | 2563490 AA | 10/2005 |
| CN | 1680151 A | 10/2005 |
| EP | 1733936 A1 | 12/2006 |
| JP | 2005-297676 A2 | 10/2005 |
| JP | 2008-018815 A2 | 1/2008 |
| JP | 04-272574 B2 | 6/2009 |
| KR | 7012440 A | 1/2007 |
| WO | WO 2005/097560 A1 | 10/2005 |

* cited by examiner

*Primary Examiner* — Sang Kim
(74) *Attorney, Agent, or Firm* — Brinks Hofer Gilson & Lione

(57) ABSTRACT

A seat belt retractor may include: a motor that generates a driving force for retracting and unreeling a seat belt by rotating a shaft, a gear case has an interior portion that houses a gear that converts a rotary force of the shaft into a driving force, a harness connected to a side of the motor including the shaft that is disposed opposite the gear case, a motor case having an opening disposed in only one end thereof, and a motor cap disposed on a side of the motor including the shaft opposing the gear case. The motor cap may include a passage portion through which the harness passes to an exterior thereof. The opening in the motor case may be sealed by attaching the motor case to the motor cap and the gear case in a sandwiched manner.

13 Claims, 8 Drawing Sheets

(a)

(b)

(a) A-A (b)

(a)

(b)

SEAT BELT RETRACTOR

RELATED APPLICATION

The present application claims priority to Japanese Patent Application No. 2009-110189, filed Apr. 28, 2009, the entirety of which is hereby incorporated by reference.

BACKGROUND OF THE INVENTION

1. Field of the Invention

The present invention relates to a seat belt retractor provided in a vehicle such as an automobile in order to retract and unreel a seat belt using a driving force from a motor.

2. Description of the Related Art

Conventionally, a vehicle seat is provided with an occupant restraining seat belt device for preventing an occupant from moving forward due to an inertial force when large deceleration acts on the vehicle, for example when the vehicle stops suddenly or crashes.

The seat belt device is provided with a retractor for retracting and unreeling the seat belt. In order to retract the seat belt without slack or looseness, the retractor unwinds or retracts the seat belt in accordance with movement of the occupant, thereby remaining in close contact with the occupant. During an emergency, such as a sudden stop or a crash, the retractor prevents the seat belt from unreeling, and as a result, the occupant is restrained.

In recent years, retractors including a motor, i.e. so-called electric retractors, have become common. An electric retractor retracts and unreels the seat belt using a driving force from the motor, thereby leading to improvements in occupant safety and user-friendliness.

An example of such an electric retractor is disclosed in Japanese Patent Application Publication No. 2005-297676, in which a webbing retraction device having a simple structure which allows variations in retraction characteristics to be set easily. Further, Japanese Patent Application Publication No. 2008-018815 discloses a motor retractor and a seat belt device employing the motor retractor with which working efficiency can be improved by facilitating electric connection between a harness assembly and a motor terminal and an assembly operation of the harness assembly.

FIG. 8 is a view showing an example of a conventional seat belt retractor. A conventional seat belt retractor 10 (hereinafter referred to as the retractor 10) includes a gear case 11 comprising a gear case upper portion 11a and a gear case lower portion 11b, a plurality of gear members 12 having a gear that is housed in the gear case 11, a motor 14, a motor front case 13 housing the motor 14, an O ring 15 serving as a waterproofing member, a motor rear case 16, a harness connection member 17, a harness 18, and a motor rear cap 19.

As described above, an electric retractor has many advantages. However, use of a motor leads to increases in the number of necessary components, the number of processing steps, and the manufacturing cost. It is desirable to achieve a reduction in manufacturing cost.

Reducing the number of components is one of the most effective ways of reducing the manufacturing cost, however, measures must be taken to ensure that defects and so on do not occur as a result. In particular, sufficient measures must be taken to ensure a waterproof property of the motor case housing the motor and the connection between the motor and the harness that supplies the motor with power, i.e. in areas where defects are most likely to occur.

More specifically, when water infiltrates the motor interior, the motor is likely to malfunction, and therefore a high degree of waterproofing is required of the motor case housing the motor. In the motor retractor described in Japanese Patent Application Publication No. 2008-018815, for example, infiltration of water or the like through the rear side of the motor is prevented by a motor seal ring (also referred to as an O ring) and a grommet. Further, in this motor retractor, an opening portion is provided in the motor cover, and therefore measures must also be taken to prevent water infiltration through this part (the front side of the motor).

When a connection defect occurs between the motor and the harness, the motor cannot operate correctly, and therefore a reliable connection is required in the connecting part between the motor and the harness. In the webbing retraction device described in Japanese Patent Application Publication No. 2005-297676, for example, the harness is wound around the periphery of the retractor and may therefore be pulled unintentionally when attaching the retractor to a vehicle body, thereby leading to a connection defect between the motor and the harness.

SUMMARY OF THE INVENTION

In consideration of these problems, an object of the present invention may be to provide a seat belt retractor with which reductions in a number of components, a number of processing steps, and a manufacturing cost, while still securing a sufficient waterproof property in a motor case and a sufficient harness connection.

In one aspect, a seat belt retractor may include a motor that generates a driving force for retracting and unreeling a seat belt by rotating a shaft; a gear case that houses a gear for converting a rotary force of the shaft into the driving force in an interior thereof; a harness that is connected to a side of the motor including the shaft, which opposes the gear case, so as to supply a power to the motor; a motor case that has an opening in only one end thereof and houses the motor from a side of the motor to which the harness is not connected; and a motor cap that is disposed on the side of the motor including the shaft opposing the gear case and includes a passage portion through which the harness passes to the exterior, wherein the opening in the motor case is sealed by sandwiching the motor cap between the motor case and the gear case.

According to the above configuration, the harness is connected to the side of the motor that includes the shaft opposing the gear case, in contrast to a conventional retractor in which the harness is connected to the side of the motor that does not include the shaft opposing the gear case. In other words, the shaft opposing the gear case and the harness are provided on the same side of the motor, and no members that lead out to the exterior of the motor case are provided on the side that does not include the shaft. Hence, because an opening need be provided in only one end of the motor case, the motor can be inserted via the opening from the side that does not include the shaft opposing the gear case, and the other end (the opposite side to the side that does not include the shaft once the motor is housed) contains no opening and is therefore sealed. As a result, waterproofing processing need be performed only on the end of the motor case that includes the opening.

The opening in the motor case that requires waterproofing processing may be sealed using a simple method of sandwiching the motor cap between the motor case and the gear case, and in so doing, the motor can be made reliably waterproof.

Further, according to the above configuration, the harness is protected by the passage portion through which the harness passes to the exterior, thus resulting in improvements in the connection strength and durability of the harness. The harness may be provided on the same side of the motor as the shaft opposing the gear case, which allows the passage portion to be provided on the gear case.

Moreover, since the harness is conventionally led out from the other end of the motor case, a waterproofing member such as an O ring, which is conventionally provided between the motor case and the side of the motor not including the shaft opposing the gear case, can be omitted. Hence, in this embodiment, the number of components and the number of processing steps are reduced, which leads to a reduction in manufacturing cost.

Further, the opening in the motor case on the side where the shaft opposes the gear case is sealed by sandwiching the motor cap between the motor case and the gear case from opposite directions. In this embodiment, a waterproofing member such as an O ring is not required, and therefore the waterproof property of the motor case is secured without an increase in the number of components.

The motor cap preferably further includes a sandwiched portion that projects from a side face thereof around an outer periphery thereof, and the sandwiched portion is preferably sandwiched between the motor case and the gear case.

In this embodiment, stability is maintained while sandwiching the motor cap. The motor case and gear case sandwich the motor cap from opposite directions with a large amount of force so that the waterproof property is secured. However, if the entire motor cap is sandwiched at this time, a load acts on the entire side face of the motor cap, and as a result, the motor cap may deform. With the configuration described above, however, only the sandwiched portion of the motor cap need be sandwiched, and therefore this problem of deforming the motor cap does not occur.

The passage portion preferably projects from the side face of the motor cap such that the passage portion is sandwiched between the motor case and the gear case.

When the passage portion projecting from the side face of the motor cap is sandwiched between the motor case and the gear case, as in the above described embodiment, a waterproof property is achieved, and moreover, rotation of the motor cap in the horizontal direction and movement in the up-down direction are restricted. Hence, the motor cap, and accordingly the harness connected to the motor via the motor cap, are accurately positioned. As a result, a connection defect between the harness and the motor caused by a shifting of the motor cap can be prevented, thus leading to an improvement in the reliability of the connection between the two components.

The motor cap preferably further includes a tubular through hole into which the shaft is inserted. A projecting portion that projects from an inner periphery of the through hole may be provided on a motor side edge of the through hole, and the through hole in the motor cap may be sealed by sandwiching the projecting portion between the motor and the gear case.

With this configuration, water infiltration into the motor case through the through hole can be prevented, leading to an improvement in the waterproof property of the motor case. Further, by providing the projecting portion on the motor side edge of the through hole, the through hole, which is difficult to sandwich using the motor case due to its location in the center of the motor cap, can be sandwiched by the motor itself.

The motor cap may also closely contact the motor case or the gear case on parts of the side face other than the sandwiched portion.

In this embodiment, the motor cap may closely contact the motor case or the gear case on the parts of the side face other than the sandwiched portion, and therefore a contact area between the motor cap and the motor case or the gear case may increase. As a result, water infiltration into the motor case, and accordingly the motor, can be prevented even more favorably.

The sandwiched portion may be a flange provided near an edge of the side face of the motor cap.

In this embodiment, the motor cap may be sandwiched by the flange located close to the motor case, and therefore the flange is sandwiched in a position where the gear case overlaps substantially the entire motor cap. Therefore, the aforementioned contact area between the motor cap and the motor case or the gear case can be maximized, thereby significantly improving the waterproof property of the motor case.

An introduction hole that projects in a tubular shape is preferably provided on a surface of the gear case that opposes the motor cap, and an outer surface of the introduction hole preferably closely contacts an inner surface of the through hole in the motor cap.

As noted above, the projecting portion may be provided on the motor side edge of the through hole. In this embodiment, the motor cap also closely contacts the outer surface of the introduction hole in the gear case on a portion of the inner surface located further toward the gear case than the projecting portion, or in other words the inner surface of the through hole. As a result, the contact area between the motor cap and the gear case increases, thereby enabling a further improvement in the waterproof property of the motor case.

The gear case preferably includes a wire groove that follows a track having an inflection point. The harness passing to the exterior from the passage portion is preferably installed in the wire groove.

In this embodiment, even if a force acts on the harness in a direction that would pull the harness to the outside of the motor cap from the passage portion, the force is received by the inflection point part of the wire groove. Hence, the force acts on the strong harness part instead of acting directly on the weak connection part between the motor and the harness. Therefore, the harness can be prevented from becoming detached from the motor, and thus the reliability of the connection between the two components can be improved.

Thus, the motor can be made reliably waterproof using a simple method. Further, the connection strength and durability of the harness connected to the motor are improved. Moreover, the seat belt retractor includes fewer parts and processing steps, and accordingly, the manufacturing cost can be reduced.

The foregoing paragraphs have been provided by way of general introduction, and are not intended to limit the scope of the following claims. The presently preferred embodiments, together with further advantages, will be best understood by reference to the following detailed description taken in conjunction with the accompanying drawings.

DETAILED DESCRIPTION OF THE PREFERRED EMBODIMENTS

Embodiments of the present invention will be described in detail below with reference to the attached drawings. Dimensions, materials, specific numerical values, and so on indicated in this embodiment are merely examples for facilitating comprehension of the invention, and unless indicated otherwise, the present invention is not limited thereto. Note that in the specification and drawings, elements having substantially identical functions and structure have been allocated identical reference symbols and duplicate description thereof has been omitted. Further, elements that are not directly related to the present invention have been omitted from the drawings.

(Seat Belt Device)

Figure 1:
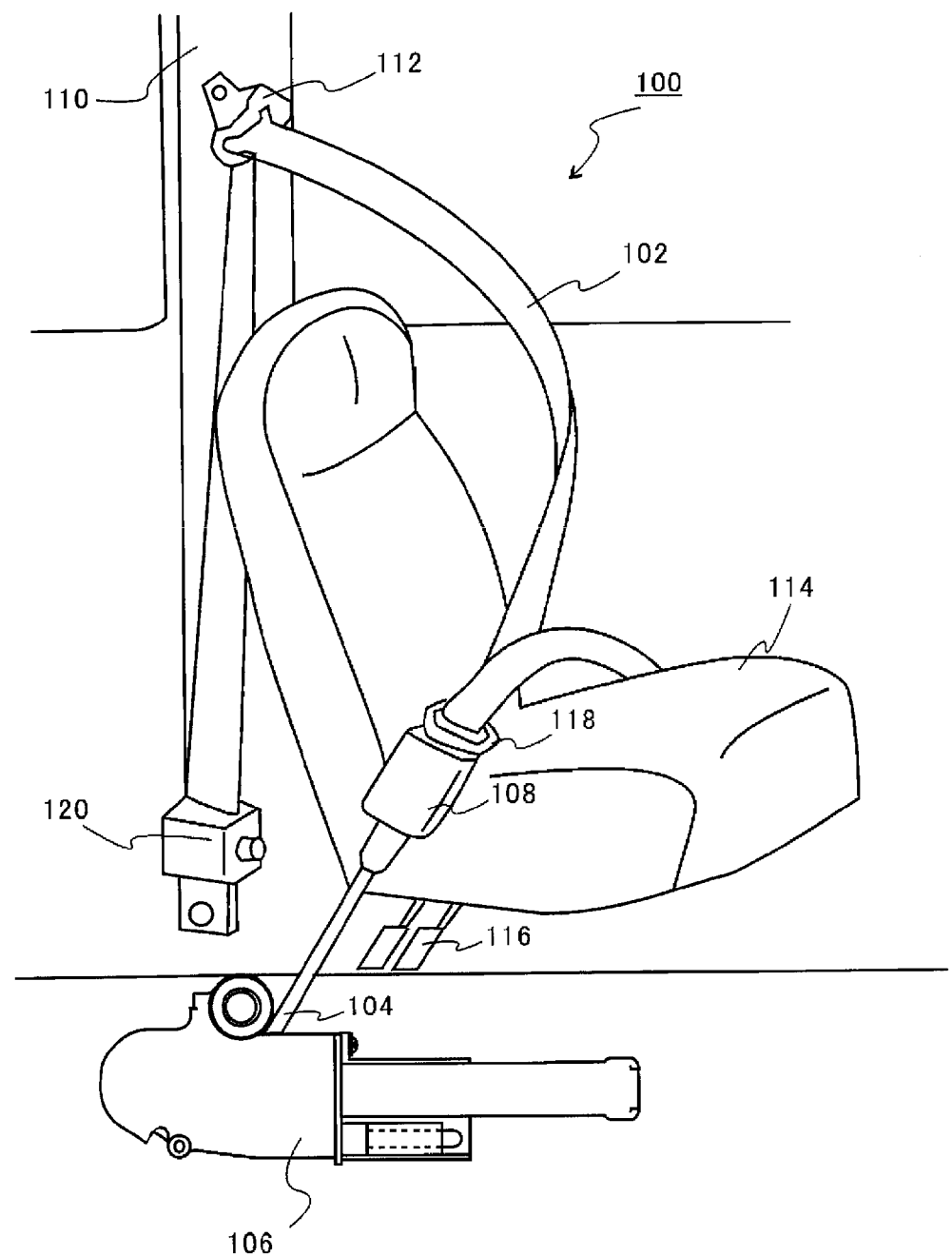
FIG. 1 is a view showing an example of a seat belt device including a seat belt retractor according to an embodiment.

FIG. 1 is a view showing an example of a seat belt device including a seat belt retractor according to this embodiment. In FIG. 1, a seat belt device 100 includes a seat belt 102 for restraining an occupant, a wire 104 connected at one end to the seat belt 102, a pretensioner 106 that pulls in the wire 104 during an emergency, and a seat belt retractor 120 (hereinafter referred to simply as the retractor 120) for reeling the seat belt 102, and thus, restraining the occupant (not shown in the drawing) by the seat belt 102.

The retractor 120 is a device for retracting the seat belt 102, and is fixed to a lower portion of a center pillar 110 on a cabin interior side. The seat belt 102 is unreeled from the retractor 120 in an upward direction of the vehicle body. The seat belt 102 passes through a through ring 112 attached to an upper portion of the center pillar 110, and is folded back in a downward direction of the vehicle body. A tip end portion of the seat belt 102 is then fixed to an anchor plate 116 provided between the center pillar 110 and a seat 114.

A tongue 118 is adjustably provided on a part of the seat belt 102 disposed between the through ring 112 and the anchor plate 116 so as to divide the seat belt 102 into portions that extend over a lap and a torso of a passenger, respectively. The tongue 118 is attached to and detached from a seat belt buckle 108 disposed on a side of the seat 114 that is opposite of the anchor plate 116.

(Seat Belt Retractor)

Figure 2:
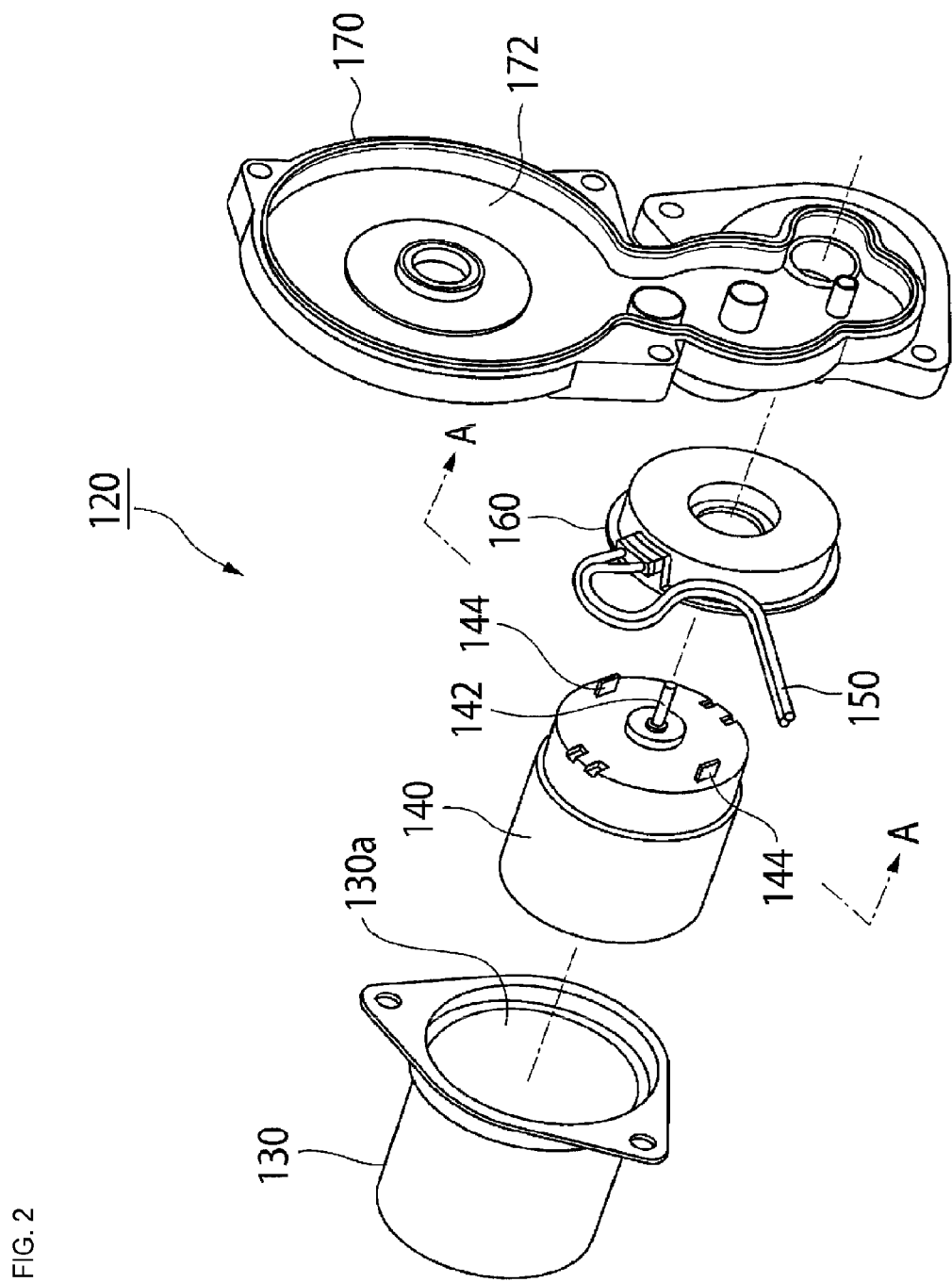
FIG. 2 is a view showing the seat belt retractor of FIG. 1 in detail.

FIG. 2 is a view showing the seat belt retractor 120 of FIG. 1 in detail. The seat belt retractor 120 includes a motor case 130, a motor 140, a harness 150, a motor cap 160, and a gear case 170. Note that the seat belt retractor 120 includes gears housed in the gear case 170 in addition to the members noted above. Furthermore, to be precise, the gear case 170 shown in FIG. 2 forms a part (a gear case lower portion) of the gear case together with a gear case upper portion that forms a pair therewith and houses gears in its interior. However, to facilitate comprehension, these components have been omitted from the drawing.

The motor case 130 has an opening 130a in only one end, and the motor 140 is inserted into the motor case 130 from a side of the motor 140 to which the harness 150 is not connected. The opening 130a in the motor case 130 is sealed by sandwiching the motor cap 160 between the motor case 130 and the gear case 170 from opposite directions.

The motor 140 generates a driving force for retracting and reeling the seat belt 102 (see FIG. 1) by rotating a shaft 142. The shaft 142 causes a gear (not shown) to rotate in accordance with rotation of the motor 140, and although not shown in FIG. 2, the shaft 142 may also project from a surface of the motor 140 that opposes the motor case 130.

A connection terminal 144 to which the harness 150 is connected is provided on the side of the motor 140 that includes the shaft 142 opposing the gear case 170. Hence, in the retractor 120, the harness 150 is connected to the same side of the motor 140 as the side including the shaft 142 opposing the gear case 170. In other words, no members that lead out to the exterior of the motor case 130 are provided on the side of the motor 140 that does not include the shaft 142 opposing the gear case 170 (the side of the motor 140 that opposes the motor case 130).

Thus, the opening 130a need be provided in only one end of the motor case 130, and therefore the other end (the opposite side of the motor 140 to the side that does not include the shaft 142 opposing the gear case 170 once the motor 140 is housed), which does not contain any apertures or the like, is naturally sealed. That is, it is unnecessary to seal the closed end of the motor case 130 as it contains no entrance or exit paths for fluids. As a result, waterproofing processing need be performed only on the end of the motor case 130 that includes the opening 130a.

The opening 130a in the motor case 130 that requires waterproofing processing is sealed by sandwiching the motor cap 160 between the motor case 130 and the gear case 170, and in so doing, the motor can be made reliably waterproof.

Further, according to the configuration described above, the harness 150 is protected by a passage portion 162 through which the harness 150 passes to the exterior, leading to improvements in the connection strength and durability of the harness 150. The harness 150 is provided on the same side of the motor 140 as the shaft 142 opposing the gear case 170, and therefore the passage portion 162 can be provided on the gear case 170.

Furthermore, a waterproofing member such as an O ring, which is conventionally provided between the motor case 130 and the side of the motor 140 that does not include the shaft 142 opposing the gear case 170, can be omitted. Hence, reductions in the number of components and the number of processing steps of the retractor 120 can be achieved, leading to a reduction in manufacturing cost.

In this embodiment, the motor 140 includes two connection terminals 144, but the present invention is not limited to this example, and the number of connection terminals 144 may be modified as desired in accordance with a number of lines of the harness 150 connected thereto.

The harness 150 is connected to the side of the motor 140 that includes the shaft 142 opposing the gear case 170 (in this embodiment, the connection terminals 144 provided on that side) via the motor cap 160 in order to supply power to the motor 140.

The motor cap 160 is disposed on the side of the motor 140 that includes the shaft 142 opposing the gear case 170 (the side of the motor 140 to which the harness 150 is connected), and the opening in the motor case 130 is sealed by sandwiching the motor cap 160 between the motor case 130 and the gear case 170 from opposite directions. As a result, the motor case 130 is waterproof.

Figure 3:
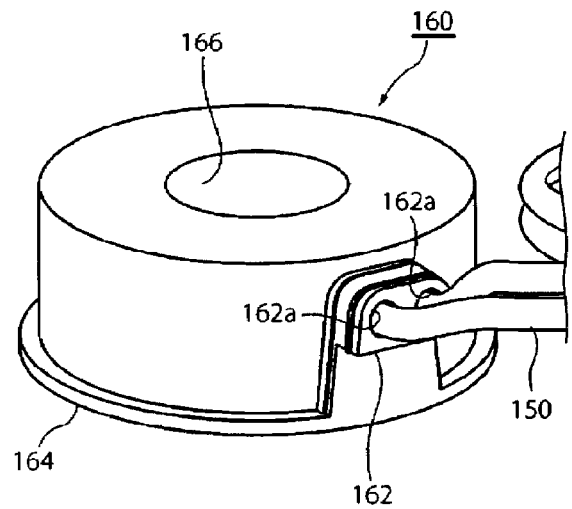
FIG. 3 is a view showing a motor cap of FIG. 2 in detail.
Figure 3:
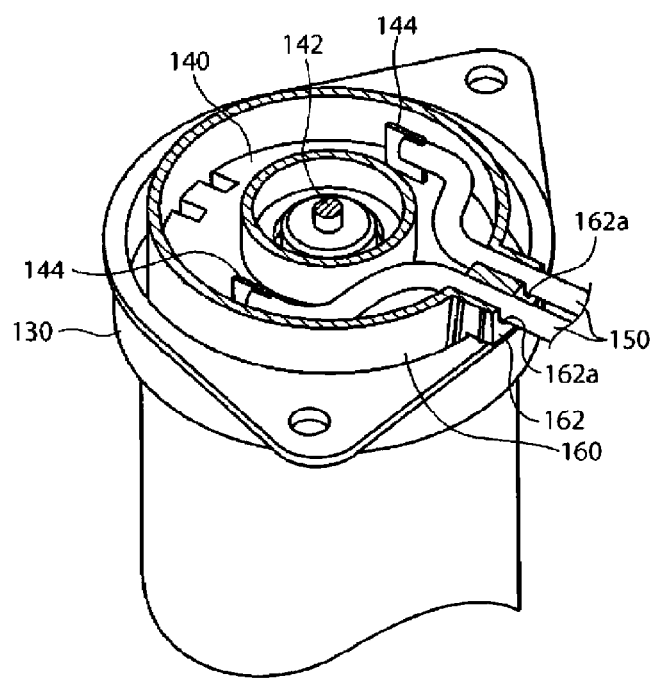

FIG. 3 is a view showing the motor cap 160 of FIG. 2 in detail. FIG. 3A is a view showing an example of the motor cap 160, and FIG. 3B is a sectional view showing an example of a state in which the harness 150 is connected to the motor 140 via the motor cap 160.

As shown in FIG. 3A, the motor cap 160 includes the passage portion 162 through which the harness 150 passes to the exterior. The passage portion 162 projects from a side face of the motor cap 160. The passage portion 162 is sandwiched between the motor case 130 and the gear case 170 such that the motor case 130 remains waterproof and movement (shifting) of the motor cap 160 is restricted.

In this embodiment, the passage portion 162 includes two passage holes 162a through which the harness 150 is passed. As shown in FIG. 3B, the harness 150 is connected to the motor 140 via the motor cap 160 (the insertion portion 162). Note that the number of passage holes 162a is not limited to this example and may be modified appropriately in accordance with the number of harnesses 150, etc. to be connected to the motor 140.

The motor cap 160 further includes a sandwiched portion 164 that projects around an outer periphery thereof from the side face thereof. The sandwiched portion 164 can be attached between the motor case 130 and the gear case 170 in a sandwiched configuration maintains the stability of the motor cap 160.

In this embodiment in particular, the sandwiched portion 164 may be a flange provided near the edge of the side face of the motor cap 160. The motor cap 160 may be sandwiched between the motor case 130 and the gear case 170 by the flange located in the vicinity of the motor case 130, and therefore the gear case 170 overlaps substantially the entire motor cap 160.

The motor cap 160 further includes a tubular through hole 166 into which the shaft 142 opposing the gear case 170 is inserted. The shaft 142 may be inserted into the through hole 166 and coupled to the gear housed in the gear case 170. Furthermore, although not shown in FIG. 3, a projecting portion 166a that projects from an inner periphery of the through hole 166 is provided on a motor 140 side edge of the through hole 166 (see FIG. 7). The projecting portion 166a is sandwiched between the motor 140 and the gear case 170 from opposite directions, thereby sealing the through hole 166.

Figure 4:
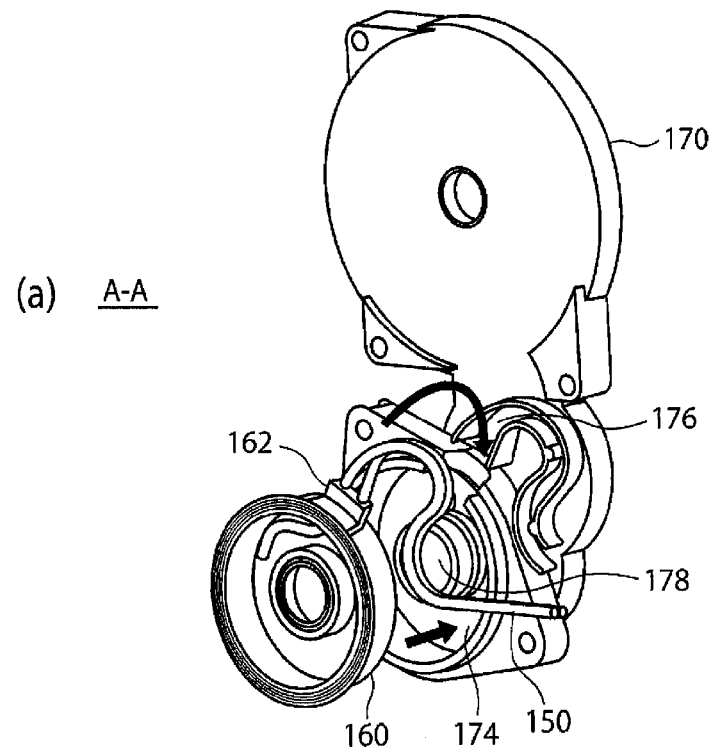
FIG. 4 is a view showing a gear case of FIG. 2 in detail.
Figure 4:
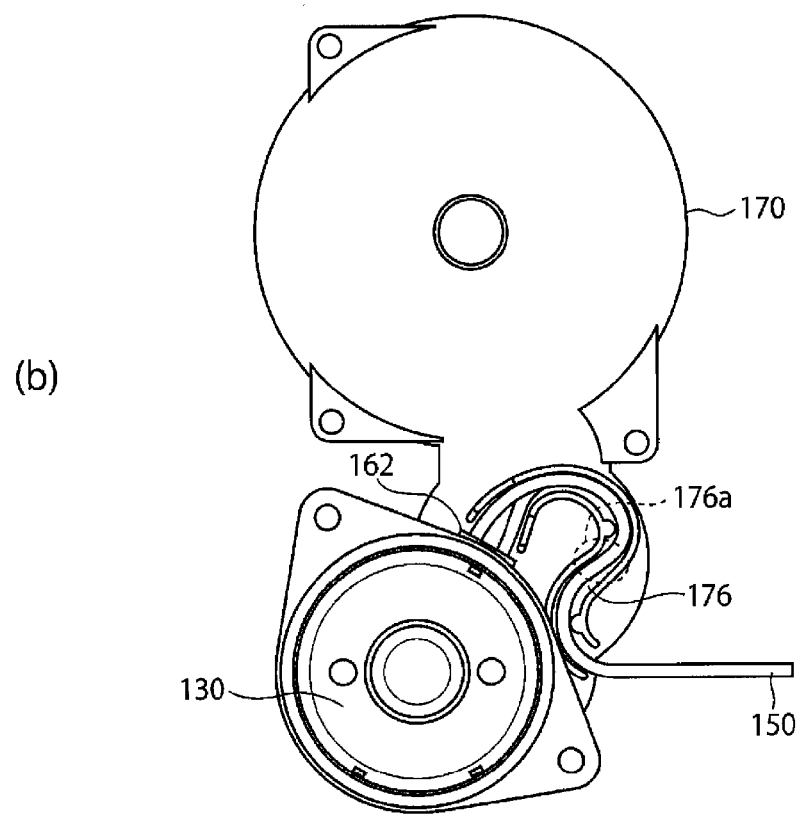

FIG. 4 is a view showing the gear case 170 of FIG. 2 in detail. A gear (not shown) for converting a rotary force of the shaft 142 into the driving force is housed in the interior of the gear case 170. FIG. 4A is an A-A sectional view of FIG. 2, and FIG. 4B is a view showing an example of the gear case 170 when the harness 150 is inserted therein.

A gear housing portion 172 for housing the gear is provided on a surface of the gear case 170 that does not oppose the motor cap 160 (see FIG. 2). The gear is housed in the gear case 170 such that the shaft 142 of the motor 140 can be coupled to the gear. Further, as shown in FIG. 4A, a cap housing portion 174 for housing the motor cap 160 is provided on a surface of the gear case 170 that opposes the motor cap 160. Thus, the motor cap 160 can be housed in the gear case 170.

A wire groove 176 taking a shape (e.g. an inverted S shape in FIG. 4) that follows a track having an inflection point 176a is provided in the surface of the gear case 170 that opposes the motor cap 160. By moving the motor cap 160 and the harness 150 in the direction of an arrow from the state shown in FIG. 4A, the wire groove 176 is positioned at an outlet of the passage portion 162 of the motor cap 160, as shown in FIG. 4B, whereupon the harness 150 passing to the exterior from the passage portion 162 is installed in the wire groove 176.

As described above, this configuration is made possible by forming the sandwiched portion 164 of the motor cap 160 from the flange provided near the edge of the side face of the motor cap 160. The flange is sandwiched in a position where the gear case 170 overlaps substantially the entire motor cap 160. Therefore, the passage portion 162 of the motor cap 160 can be housed in the interior of the gear case 170 in a substantially complete manner, and the wire groove 176 can be set to start from the outlet of the passage portion 162.

With this embodiment, even if a force acts on the harness 150 in a direction that pulls the harness 150 from the passage portion 162 and toward the outside of the motor cap 160, the force is received by the inflection point 176a part of the wire groove 176. In other words, the force acts on the strong harness 150 part instead of acting directly on the weak connection part between the connection terminal 144 of the motor 140 and the harness 150. In contrast, in the case where the harness 150 is installed on a track that does not include the inflection point 176a, such as a simple curve, for example, the harness 150 can be prevented from becoming detached from the motor 140, and thus the reliability of the connection between the two components can be improved.

An introduction hole 178 projecting in a tubular shape is provided in the surface of the gear case 170 opposing the motor cap 160. Accordingly, the shaft 142 of the motor 140 opposing the gear case 170 can be introduced into the introduction hole 178 via the motor cap 160 and coupled to the gear housed in the gear housing portion 172 of the gear case 170.

Figure 5:
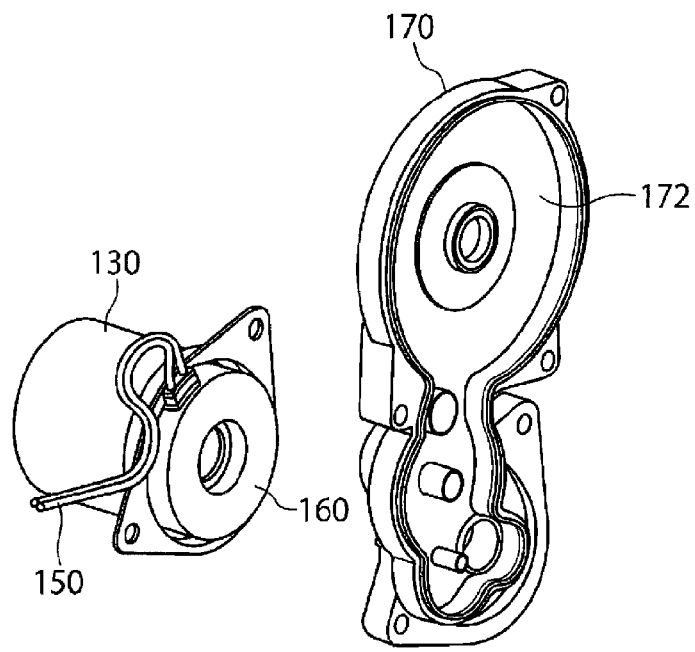
FIG. 5 is a view illustrating assembly of the retractor shown in FIG. 2.
Figure 5:
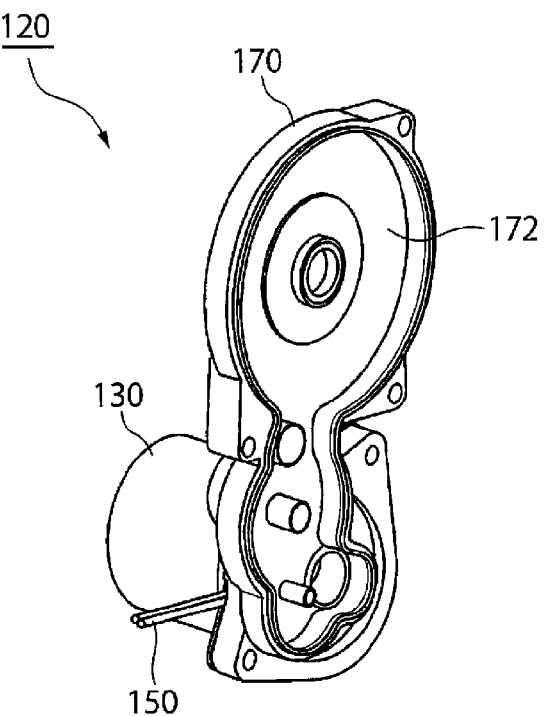

FIG. 5 is a view illustrating assembly of the retractor 120 shown in FIG. 2. First, the motor 140 is inserted in the motor case 130 shown in FIG. 2 through the opening 130a from the side of the motor 140 that does not include the shaft 142 opposing the gear case 170. Next, the harness 150 is passed through the passage portion 162 of the motor cap 160 and connected to the connection terminals 144 of the motor 140. The motor cap 160 through which the harness 150 passes is then covered by the opening 130a of the motor case 130. As a result, a state shown in FIG. 5A is obtained.

Next, the gear case 170 is attached to the motor case 130 covering the motor cap 160 as shown in FIG. 5A. As a result, the opening 130a of the motor case 130 is sealed, as shown in FIG. 5B. The gear (not shown) is then inserted into the gear housing portion 172 of the gear case 170, whereupon the gear housing portion 172 is sealed by a gear case (not shown) that forms a pair with the gear case 170.

Note that the present invention is not limited to the operation sequence described above, and the operation sequence may be modified appropriately as necessary. For example, the gear may be inserted into the gear case 170 (the gear housing portion 172) before attaching the motor cap 160, motor 140, and motor case 130 to the gear case 170.

Figure 6:
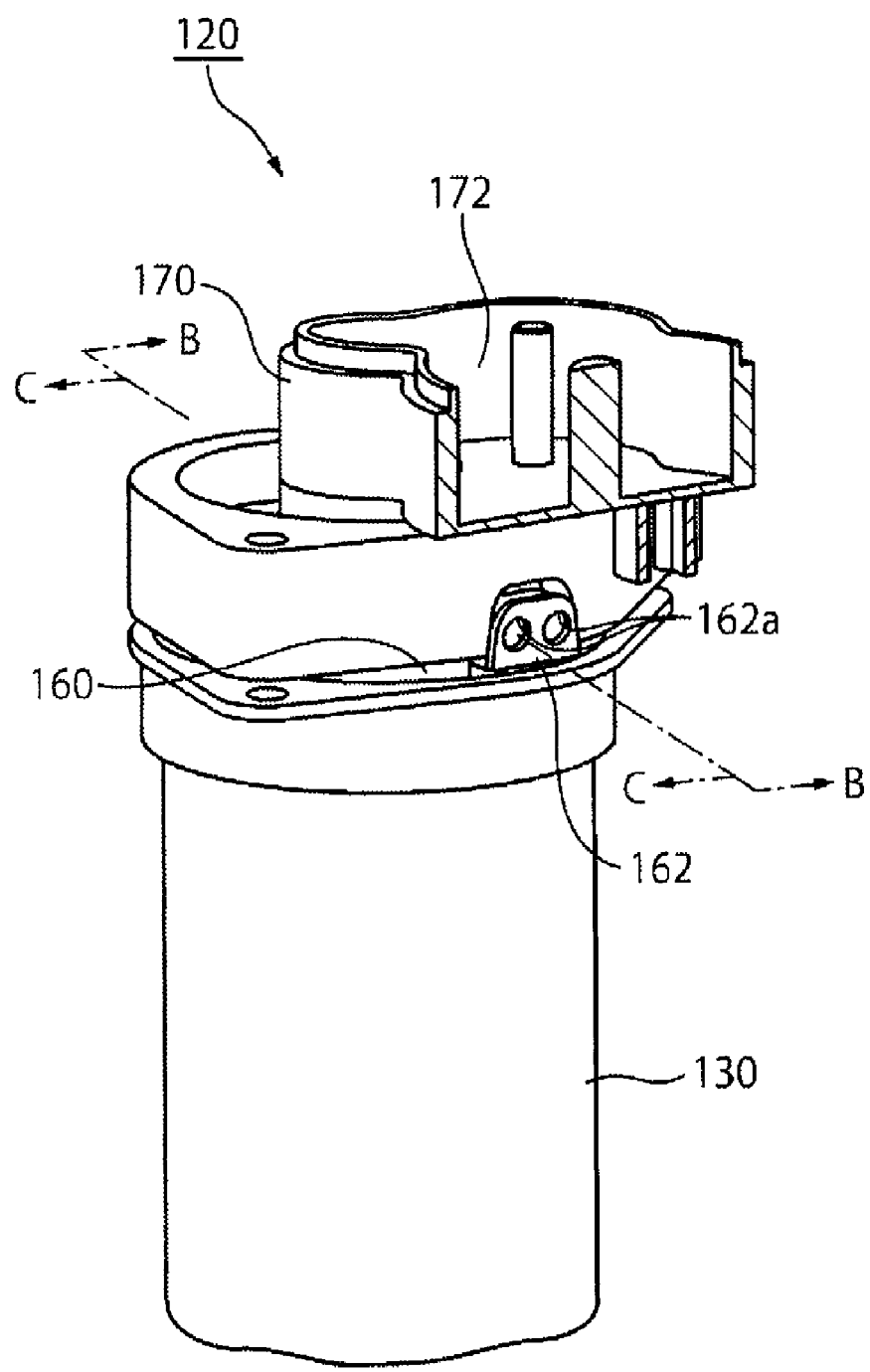
FIG. 6 is a partially enlarged view of FIG. 5.
Figure 7:
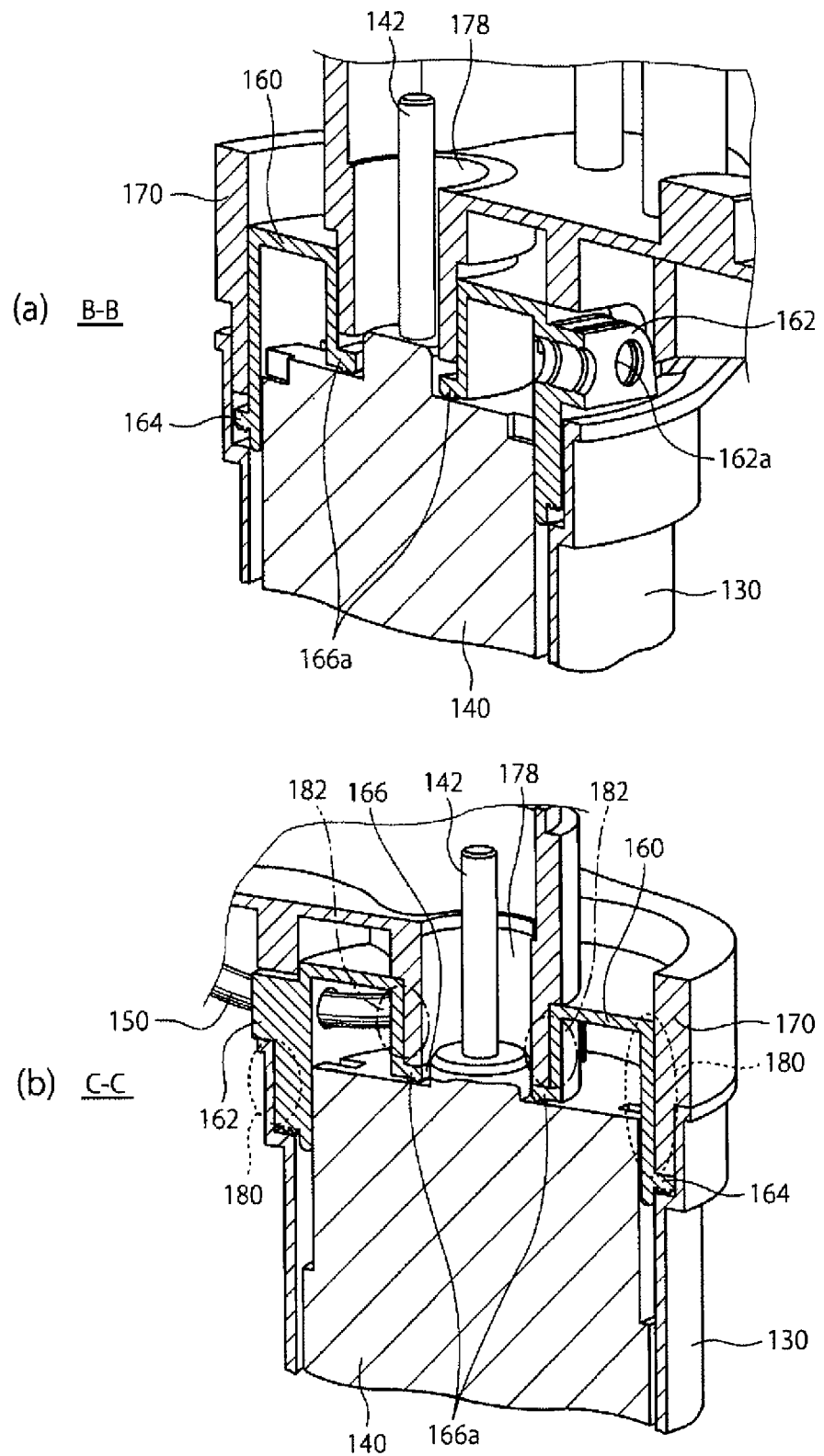
FIG. 7 is a sectional view of FIG. 6.
Figure 8:
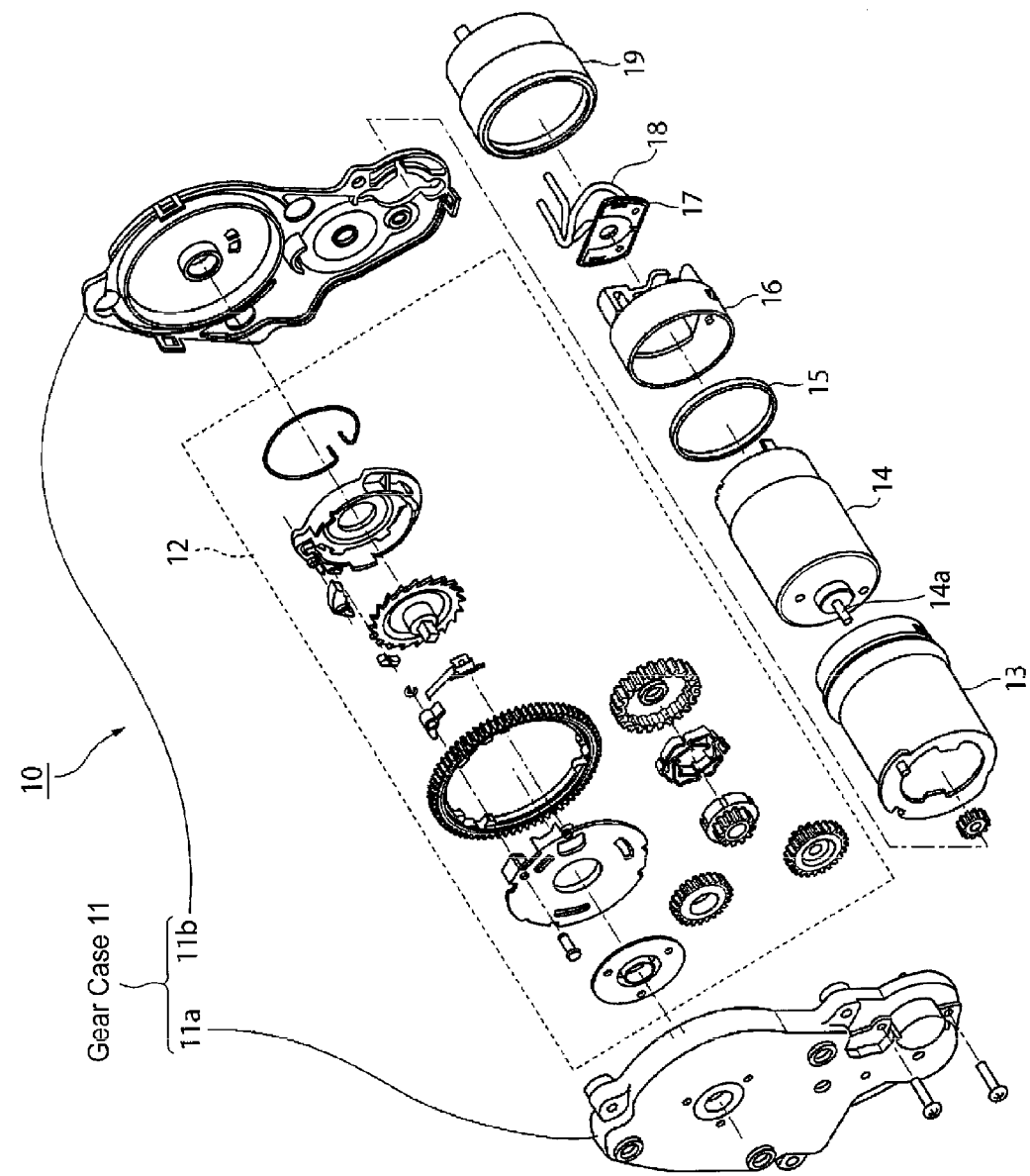
FIG. 8 is a view showing an example of a conventional seat belt retractor.

FIG. 6 is a partially enlarged view of FIG. 5, and FIG. 7 is a sectional view of FIG. 6. FIG. 7A is a B-B sectional view of FIG. 6, and FIG. 7B is a C-C sectional view of FIG. 6. Note that in order to facilitate comprehension, FIGS. 6 and 7A show a state in which a slight gap is provided between the motor case 130 and the gear case 170, in contrast to the state of close contact shown in FIG. 5.

As shown in FIG. 6, when the retractor 120 is assembled in the manner described above, the passage portion 162 of the motor cap 160 is sandwiched between the motor case 130 and the gear case 170 such that only the outlet parts of the passage holes 162a are exposed from the gear case 170. By sandwiching the passage portion 162 between the motor case 130 and the gear case 170 in this manner, rotation in the horizontal direction and movement in the up-down direction (shifting) of the motor cap 160 are restricted.

More specifically, as shown in FIG. 7A, the gear case 170 and the motor case 130 are positioned above and below the passage portion 162, respectively, and therefore movement of the motor cap 160 in the up-down direction is restricted. Further, the gear case 170 is positioned to the left and right of the passage portion 162, and therefore movement of the motor cap 160 is restricted in the horizontal direction. Hence, the motor cap 160, and accordingly the harness 150 connected to the motor 140 (the connection terminal 144) via the motor cap 160, are positioned accurately. As a result, a connection defect between the harness 150 and the motor 140 caused by shifting of the motor cap 160 can be prevented, thereby leading to an improvement in the reliability of the connection between the two components.

Next, referring to FIG. 7B, when the retractor 120 is assembled, the sandwiched portion 164 (the flange in this embodiment) projecting from the side face of the motor cap 160 is sandwiched between the motor case 130 and the gear case 170 from opposite directions. With this configuration, only the sandwiched portion 164 of the motor cap 160 is sandwiched, and therefore, in comparison with a case in which the entire motor cap 160 is sandwiched, a load applied to the entire side face of the motor cap 160 can be lightened. Accordingly, deformation of the motor cap 160 caused by the load can be avoided, and stability can be maintained while the motor cap 160 is sandwiched.

The motor cap 160 is sandwiched between the motor case 130 and the gear case 170 by the sandwiched portion 164, and therefore the motor cap 160 also closely contacts the motor case 130 or the gear case 170 on parts of the side face (the part within a broken line portion 180 in FIG. 7B) other than the sandwiched portion 164. As a result, a contact area between the motor cap 160 and the motor case 130 or the gear case 170 increases, and therefore water infiltration into the motor case 130, and accordingly the motor 140, can be prevented even more favorably.

Furthermore, when the retractor 120 is assembled, the projecting portion 166a, which is provided on the motor 140 side edge of the through hole 166 in the motor cap 160 in a way that the projecting portion 166a projects from the inner periphery, is sandwiched between the motor 140 and the gear case 170 from opposite directions. By providing the projecting portion 166a on the motor 140 side edge of the through hole 166 in this manner, the through hole 166, which is difficult to sandwich using the motor case 130 due to its location in the center of the motor cap 160, can be sandwiched and sealed by the motor 140 itself. As a result, water infiltration into the interior of the motor case 130 through the through hole 166 can be prevented, leading to an improvement in the waterproof property of the motor case 130.

Similarly, the motor cap 160 closely contacts an outer surface of the introduction hole 178 in the gear case 170 on an inner surface of the through hole 166 located further toward the gear case 170 than the projecting portion 166a (within a dot-dash line portion 182 in FIG. 7B), or in other words the inner surface of the through hole 166. As a result, a contact area between the motor cap 160 and the gear case 170 increases, thus enabling a further improvement in the waterproof property of the motor case 130.

While preferred embodiments of the invention have been described, it should be understood that the invention is not so limited, and modifications may be made without departing from the invention. The scope of the invention is defined by the appended claims, and all devices that come within the meaning of the claims, either literally or by equivalence, are intended to be embraced therein. Furthermore, the advantages described above are not necessarily the only advantages of the invention, and it is not necessarily expected that all of the described advantages will be achieved with every embodiment of the invention.

The invention claimed is:

1. A seat belt retractor comprising:
   a motor that generates a driving force for retracting and unreeling a seat belt by rotating a shaft;
   a gear case housing a gear in an interior portion thereof, said gear converting a rotary force of said shaft into said driving force;
   a harness connected to a side of said motor including said shaft disposed opposite said gear case, wherein said harness supplies power to said motor;
   a motor case having an opening in only one end thereof, said motor case housing said motor from a side of said motor to which said harness is not connected; and
   a motor cap disposed on a side of said motor including said shaft opposing said gear case, said motor cap comprising a passage portion through which said harness passes to an exterior thereof,
   wherein said opening in said motor case is sealed by engaging and attaching said motor case to said gear case and positioning said motor cap in a sandwiched manner such that said motor cap is disposed between said motor case and said gear case.

2. The seat belt retractor according to claim 1, wherein said motor cap further comprises a sandwiched portion that projects from a side face thereof, said sandwiched portion extending around an at least a portion of an outer periphery of said motor cap, and
   wherein said sandwiched portion of said motor cap is sandwiched between said motor case and said gear case.

3. The seat belt retractor according to claim 2, wherein said motor cap closely contacts said motor case or said gear case on said sandwiched portion and on parts of said side face other than said sandwiched portion.

4. The seat belt retractor according to claim 3, wherein said sandwiched portion is a flange disposed near an edge of said side face of said motor cap.

5. The seat belt retractor according to claim 1, wherein said passage portion projects from a side face of said motor cap, and
   wherein said passage portion is sandwiched between said motor case and said gear case.

6. The seat belt retractor according to claim 5, wherein said gear case comprises a wire groove that is shaped in a track having an inflection point, wherein said harness passing to the exterior through said passage portion is installed in said wire groove including said inflection point.

7. The seat belt retractor according to claim 1, wherein said motor cap further comprises a tubular through hole into which said shaft is inserted,
   wherein a projecting portion that projects from an inner periphery of said through hole is disposed on a motor side edge of said through hole, and
   said through hole in said motor cap is sealed by sandwiching said projecting portion between said motor and said gear case.

8. The seat belt retractor according to claim 7, wherein an introduction hole that projects in a tubular shape is disposed on a surface of said gear case, said surface of said gear case disposed opposite said motor cap, and
   wherein an outer surface of said introduction hole closely contacts an inner surface of said through hole in said motor cap.

9. A seat belt retractor comprising:
   a motor that generates a driving force for retracting and unreeling a seat belt by rotating a shaft;
   a gear case housing a gear in an interior portion thereof, said gear converting a rotary force of said shaft into said driving force;
   a harness connected to a side of said motor including said shaft disposed opposite said gear case, wherein said harness supplies power to said motor;

a motor case having an opening disposed in only one end thereof, said motor case housing said motor from a side of said motor to which said harness is not connected;

a motor cap disposed on a side of said motor including said shaft opposing said gear case, said motor cap comprising a passage portion through which said harness passes to an exterior thereof;

wherein said opening in said motor case is sealed by attaching said motor case to said motor cap and said gear case in a sandwiched manner such that said motor cap is disposed between said motor case and said gear case;

wherein said motor cap further comprises a sandwiched portion that projects from a side face thereof, said sandwiched portion extending around an at least a portion of an outer periphery of said motor cap; and wherein said sandwiched portion of said motor cap is sandwiched between said motor case and said gear case.

10. The seat belt retractor according to claim 9, wherein said motor cap closely contacts said motor case or said gear case on said sandwiched portion and on parts of said side face other than said sandwiched portion.

11. The seat belt retractor according to claim 10, wherein said sandwiched portion is a flange disposed near an edge of said side face of said motor cap.

12. A seat belt retractor comprising:
a motor that generates a driving force for retracting and unreeling a seat belt by rotating a shaft;

a gear case housing a gear in an interior portion thereof, said gear converting a rotary force of said shaft into said driving force;

a harness connected to a side of said motor including said shaft disposed opposite said gear case, wherein said harness supplies power to said motor;

a motor case having an opening disposed in only one end thereof, said motor case housing said motor from a side of said motor to which said harness is not connected;

a motor cap disposed on a side of said motor including said shaft opposing said gear case, said motor cap comprising a passage portion through which said harness passes to an exterior thereof;

wherein said opening in said motor case is sealed by attaching said motor case to said motor cap and said gear case in a sandwiched manner such that said motor cap is disposed between said motor case and said gear case; and wherein said motor cap further comprises a tubular through hole into which said shaft is inserted, wherein a projecting portion that projects from an inner periphery of said through hole is disposed on a motor side edge of said through hole, and said through hole in said motor cap is sealed by sandwiching said projecting portion between said motor and said gear case.

13. The seat belt retractor according to claim 12, wherein an introduction hole that projects in a tubular shape is disposed on a surface of said gear case, said surface of said gear case disposed opposite said motor cap, and wherein an outer surface of said introduction hole closely contacts an inner surface of said through hole in said motor cap.

* * * * *